United States Patent [19]

Weman et al.

[11] 4,005,904
[45] Feb. 1, 1977

[54] RUN THROUGH BRACKET

[75] Inventors: Per Olof Weman, Hasloh; Harald Martin Schmelow, Ellerau, Krs. Segeberg, both of Germany

[73] Assignee: Sigmatex A.G., Geneva, Switzerland

[22] Filed: June 24, 1975

[21] Appl. No.: 589,989

[52] U.S. Cl. .............................. 297/389; 280/747; 24/163 R; 24/265 AL; 297/385
[51] Int. Cl.² .......................................... B60R 21/10
[58] Field of Search .... 24/265 R, 265 CD, 265 AL, 24/2.5, 115 K, 197, 198, 163; 297/385, 329; 248/315, 341, 498; 16/126; 280/744, 747; 105/473, 485, 475

[56] References Cited

UNITED STATES PATENTS

| | | | |
|---|---|---|---|
| 2,154,119 | 4/1939 | Bahan | 24/163 R |
| 2,309,751 | 2/1943 | Chance | 24/115 K |
| 3,279,019 | 10/1966 | Eubank | 24/200 |
| 3,428,362 | 2/1969 | Bertelson | 297/385 |
| 3,608,963 | 9/1971 | Steere | 297/385 |
| 3,622,203 | 11/1971 | Steere | 297/385 |
| 3,719,972 | 3/1973 | Klink | 24/193 |
| 3,877,114 | 4/1975 | Silen | 24/163 R |

FOREIGN PATENTS OR APPLICATIONS

| | | | |
|---|---|---|---|
| 536,978 | 4/1955 | Belgium | 24/265 RL |
| 562,329 | 11/1923 | France | 24/265 RL |

Primary Examiner—Bernard A. Gelak
Attorney, Agent, or Firm—Ernest D. Buff

[57] ABSTRACT

This invention concerns a metal guide for safety belts for vehicles, especially cars, consisting of a lashing to be fastened to the automobile body and a ring held by the lashing with an opening through which the belt runs. The lashing has detents for expanding movement and the ring has guide surfaces to reduce friction.

4 Claims, 5 Drawing Figures

RUN THROUGH BRACKET

This invention concerns a guide for safety belts for vehicles, especially cars, consisting of a lashing to be fastened to the automobile body and a ring held by the lashing with an opening through which the belt runs. The lashing has detents for expanding movement and the ring has guide surfaces to reduce friction.

BACKGROUND OF THE INVENTION

To anchor one end of the safety belt it has been the practice to use a ring which is pivotally attached to a lashing which in turn is non-pivotally attached to the floor of a vehicle or the side wall of a vehicle. For this purpose a number of different ring configurations have been proposed. Many such guides have proved to be inadequate if the belt runs from a belt winder on the floor of the vehicle vertically up to such a guide, then through it and then forward across the chest of the passenger, as shown in the French Pat. No. 1,498,883. If the passenger has an accident, the forward motion of his upper body pulls at the guide which makes the lashing pivot. If the lashing is not pivotally attached, the belt in the ring moves. Directly after this another section of the belt moves through the ring, because the belt roll does not lock immediately when the belt is pulled, but it only locks later after some more belt has been unrolled. In addition, the section of the belt between the guide and the belt winder on the floor of the vehicle is stretched with the result that more belt is pulled through the guide.

Experience has shown that with the familiar guides in the case of an accident the belt is displaced and because of the very high tension the section of the belt which is pulled through the ring is crushed, causing only a section of the belt to stay directly on the ring, unless additional measures are taken. Such wrinkling causes a much greater friction of the belt sections in the ring during an accident — a friction which does not only exist directly between the belt and the ring itself, but also within the fabric of the belt because of the pressure. Because of a reduced contact area of the belt in the ring and at the same time an increase in the tension of the belt, a considerable pressure develops between belt and ring of the guide. The outer and inner friction leads to a localization of heat in the belt which could cause a damage to or even breaking of the belt. This is true of a tension in the belt which might be considerably lower than that which a belt without wrinkles could tolerate.

German patent application Auglegeschrift No. 1,780,043 endeavored to eliminate this disadvantage and to create a metal guide for safety belts which avoids the wrinkling of the belt in case of an accident, in order to reduce the outer and inner friction of the belt, compared to the familiar metal guides, to a minimum. This was accomplished in German Pat. No. 1,780,043, among other design changes, by making the ratio of the highest height of the opening to the widest width of the opening greater or 1:3 and the transition from the bar of the ring opposite of the lashing to the side bars of the opening with a bend radius which is equal or greater than 0.2 times the height of the opening. Furthermore, the lashing on the vehicle and the ring in the lashing were pivoted in two planes vertically to each other.

The metal guide was provided to move on gimbals and turn in the direction of the tension which occurs in the metal guide during an accident. This reduced the danger of wrinkling, because the pressure on the belt at right angles to its length is only very small.

BRIEF SUMMARY OF THE INVENTION

This invention further modifies the lashing and ring to include detents on the lashing for expanding responsiveness and movement of the lashing (and decreasing friction) and guide surfaces on the ring to reduce friction. Both modifications allow for higher speed movement of the belt passing through the ring without wrinkling and excessive friction heat, which is highly advantageous with the use of three point seat belt systems. Both measures also reduce the rewind friction of the Emergency Locking Retractor.

BRIEF DESCRIPTION OF THE DRAWINGS

The invention is described with relation to a two piece carrier in FIGS. 1–4 and the one piece integral carrier of FIGS. 4 and 5.

Two models of the invention are explained in detail by referring to the attached diagrams:

FIGS. 1 to 3 show, in that embodiment, a metal guide with lashing 1 and a ring 2 which in the direction of the arrows 3 is pivotally attached in lashing 1. Lashing 1 is attached by a screw (not shown) through hole 4 to the body of the automobile (not shown), swivelling in the direction of arrows 5. The lashing 1 which is made of one piece is bent around the two straight sections 7 of the ring 2 and the ring 2 fits into lashing 1 in such a way that it can turn in lashing 1 in the direction of arrow 3 but does not rattle under normal operating conditions. The bar 8 to guide the belt under normal operating conditions is slightly curved and smoothly leads to the side bars 9 or 9' respectively to guide the belt in the case of an accident. In the case of an accident it is possible for the belt 10 to be displaced without wrinkles in the ring 2, as demonstrated in FIG. 4. In this case, the lashing 1 has turned in the direction of arrow 3.

The lashing 1 has detents or protuberance means 11, preferably on both the front and rear sides thereof and in one embodiment symmetrically placed above and below the hole 4, but at least above the hole. The detents hold the ring unit away from face to face wall and lashing contact and thus gives the ring greater room and freedom for reception of the belt which may be moving quickly therethrough. In addition, the rear protuberances provide a surface on which the ring 2 can rotate (on the protuberance which is against the wall of the vehicle) to accommodate movement of the belt as a result of forces placed on it. Placing detents on both sides of the lashing allows right and left hand exchangeability.

Figure 1:
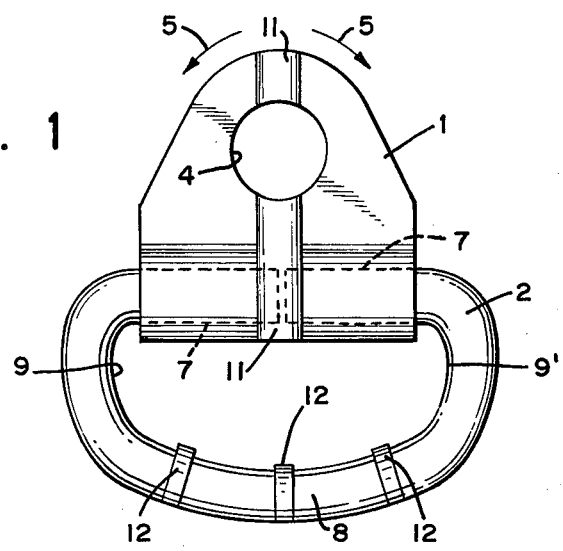
FIG. 1 shows a side view of the guide.
Figure 2:
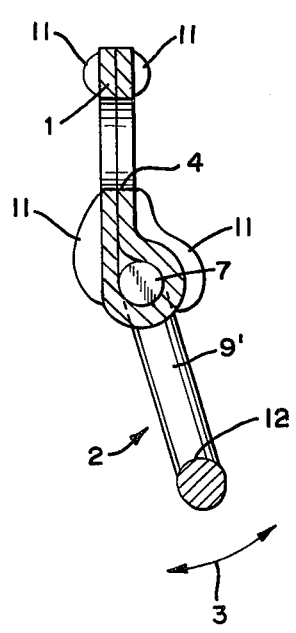
FIG. 2 shows a symmetrical cross-section of the guide according to FIG. 1.
Figure 3:
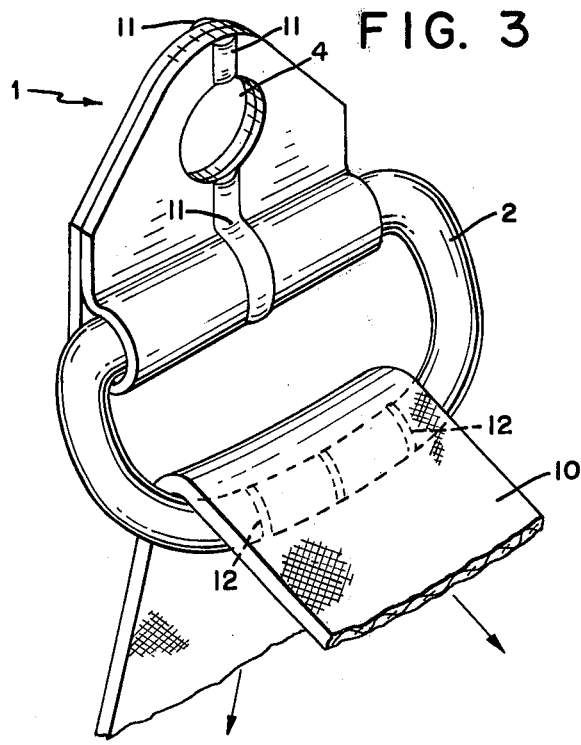
FIG. 3 shows a guide with belt under normal operating conditions in a perspective drawing.
Figure 4:
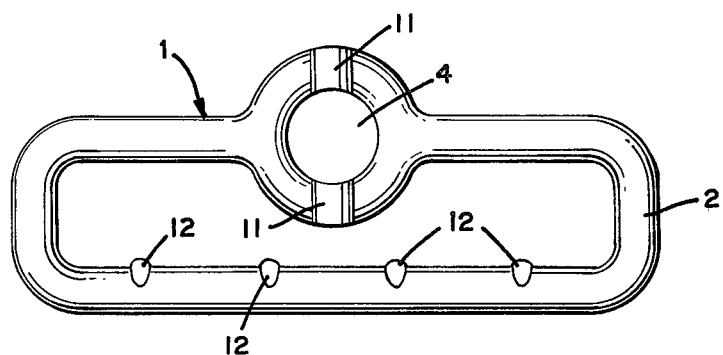
FIG. 4 shows another embodiment.
Figure 5:
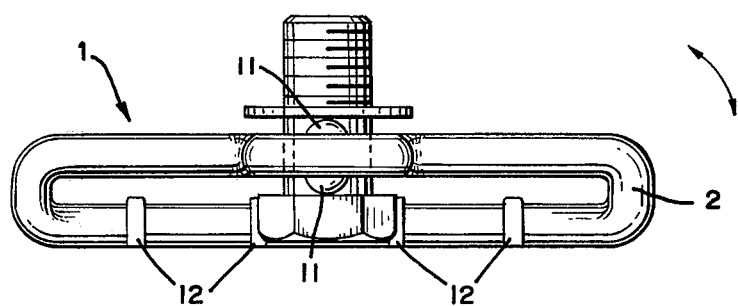
FIG. 5 shows a top view of the guide of FIG. 4, installed.

Advantageously also, the ring 2 has a plurality of guide surfaces 12 thereon, over the whole of the webbing engaging portion of the lower part of the ring (see FIGS. 1 to 3) or at least on the webbing engaging portion of the lower part of the ring (as seen in FIGS. 4 and 5), to hold the webbing away from greater contact with the ring and thus reduce fricton and allow for faster belt movement.

In FIG. 4, a bolt is shown in the assembly.

It is our intention that the scope of our invention be defined by the following claims.

We claim:

1. Guide for a safety belt for a vehicle, comprising a lashing, a ring held by the lashing, said ring having an opening through which the belt runs and being provided with a plurality of guide surfaces at least over a portion thereof which engages the belt running therethrough, said lashing having a hole therein for attachment to the vehicle, and protuberance means located adjacent said hole on at least the side of said lashing which lies against said vehicle, said protuberance means comprising elongated detent means protruding from the surface of said side and extending generally from adjacent said hole toward said ring.

2. Guide as claimed in claim 1, said protuberance means comprising a plurality of protuberances symmetrically disposed adjacent to said hole.

3. Guide as claimed in claim 2, said protuberance means located on both sides of said lashing.

4. Guide as claimed in claim 1, wherein said plurality of guide surfaces are provided over substantially the entire belt engaging portion of said ring.

* * * * *